Jan. 13, 1948.  J. A. GIROUX  2,434,359
INTERMITTENT STRIP FEED PROJECTOR MECHANISM
Filed May 21, 1946
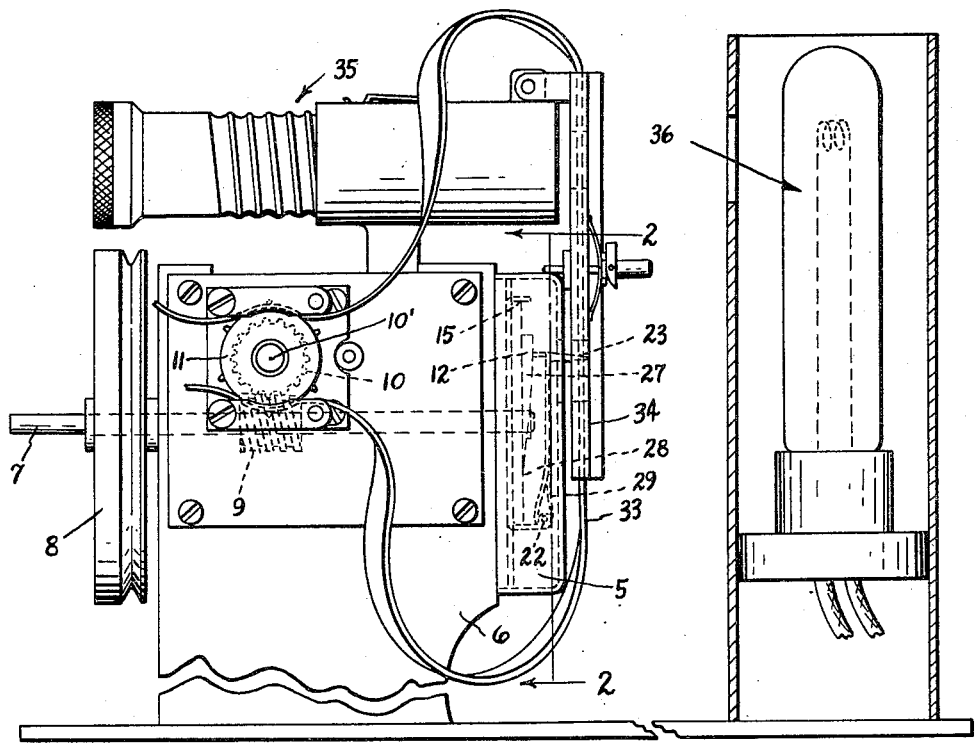
Fig. 1
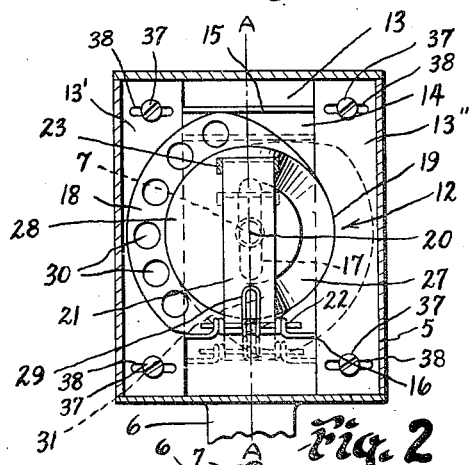
Fig. 2
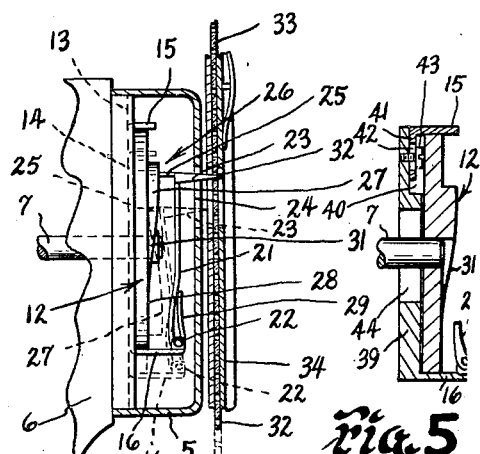
Fig. 3
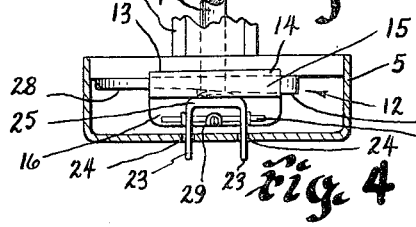
Fig. 4
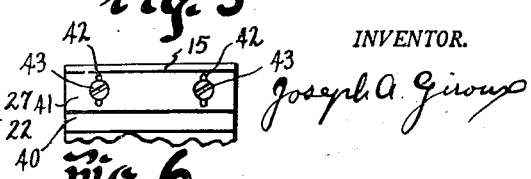
Fig. 5
Fig. 6
INVENTOR.
Joseph A. Giroux Patented Jan. 13, 1948

2,434,359

UNITED STATES PATENT OFFICE 2,434,359

INTERMITTENT STRIP FEED PROJECTOR MECHANISM

Joseph A. Giroux, Southbridge, Mass.

Application May 21, 1946, Serial No. 671,161

7 Claims. (Cl. 88—18.4)

This invention relates to moving picture projectors and has as one of its principal objects the provision of novel, simple and compact means for successively and intermittently advancing a film relative to the framing opening of such projectors.

Another important object is to provide novel means and method of forming a device of the above character whereby its working parts may be adjusted to compensate for wear, will in no way interfere with other working parts of the projector and will be encased and protected against the collection of dirt, dust, etc. thereon.

Devices for successively and intermittently advancing a film relative to the framing opening of a projector are not new in the art. Such devices, however, in the past have embodied working parts which required considerable operating space and were of such nature as to necessitate careful design and relating of associated parts of the projector so as to avoid working interference. Such prior art devices not only greatly limited the scope of design of projectors of this nature, but in most instances the major working parts of such devices were exposed to the collection of dirt, dust and so forth thereon.

The present invention overcomes all of the above difficulties through the provision of simple, efficient and compact film advancing means wherein all of its working parts are encased and sealed in a single housing and will in no way interfere with the operation of or limit the scope of design of other working parts of the projector.

Another important feature of the present invention is that the device has substantially the same dimensional characteristics on the opposed sides of a vertical center line extending through said device and permits ready access to the film gate and enables the ready threading of a film gate from either side of the projector.

Referring to the drawings:

Fig. 1 is a fragmentary side elevational view of a projector embodying the present invention;

Fig. 2 is a sectional view taken as on line 2—2 of Fig. 1 and looking in the direction indicated by the arrows;

Fig. 3 is a fragmentary side elevational view of the device showing a portion of the housing in section and showing the related film gate and film;

Fig. 4 is a top plan view of the device showing the housing in section;

Fig. 5 is a fragmentary sectional view of a modified form of slide member; and

Fig. 6 is a fragmentary face view of a portion of the modified slide member shown in Fig. 5.

Referring to the various figures in the drawings, the device embodying the invention comprises a housing 5 secured to a base 6 of the projector.

In the base 6 there is rotatably supported a shaft 7 driven by a pulley 8. Power is imparted to the pulley 8 by a belt drive connection or the like with a motor or other suitable driving means, not shown, and in the conventional manner.

The shaft has a drive worm 9 thereon in constant mesh with a worm gear 10 mounted on the shaft 10'. This is to impart a rotary movement to the sprocket 11 in the conventional manner.

The shaft 7, internally of the housing 5 in accordance with the present invention, has a cam plate designated generally by the numeral 12, secured thereto and adapted to be rotated thereby.

The rear inner wall of the housing 5 is provided with a vertical slideway 13 in which a slide member 14 is slidably mounted. The slideway 13 is formed by two spaced parallel plates 13' and 13" which are secured to the rear wall of the housing by screws or the like 37. The screws 37 extend through slots 38 in the plates and may be loosened to permit adjustment of the plates to compensate for wear of the parts and to eliminate looseness and play between the slide and slideway.

The slide member 14 has upper and lower outwardly deflected or bent portions forming upper and lower lip members 15 and 16 between which the cam plate 12 is rotatably mounted. The slide member 14 is provided with a longitudinal slot 17 which straddles the end of the shaft 7 to permit reciprocation of said slide member in the slideway 13.

The cam plate 12 has a raised portion 18 tapering at its ends into a lowered portion 19. The cam portions are so shaped as to introduce a reciprocating movement of the slide member upwardly and downwardly in the slideway 13 when the shaft 7 is rotated. The respective raised and lowered portions 18 and 19 are so shaped and related with each other and the distance between the upper and lower lips 15 and 16 is so controlled as to cause an intimate running fit of said related parts to be maintained at all times and all looseness and play between said parts is thereby eliminated.

As stated above this imparts a reciprocating movement to the slide member 14 in a direction upwardly and downwardly of the slideway 13 and the extent of said movement is controlled by the amount of offset of said raised and lowered portions 18 and 19 with respect to the center 20 of the cam.

The lower lip 16, as shown best in Figs. 2, 3 and 4, has an arm 21 pivotally attached thereto at 22. The arm 21 has claw members 23 angularly disposed and projecting outwardly of the upper end thereof, as shown best in Fig. 3. The claws 23 extend outwardly of slots 24 formed in the housing 5. Adjacent the claws 23 and extending rearwardly thereof the arm 21 is provided with a cam contact member 25 adapted to engage a side surface cam 26 formed on the front of the cam plate 12.

The side surface cam has a raised portion 27 and a lowered portion 28 which, during the rotation of the cam plate 12, and through engagement of the cam contact 25 therewith is adapted to move the arm 21 about its pivot 22 and in turn move the claws 23 outwardly and inwardly of the slots 24.

A spring 29 is adapted to resiliently maintain the cam follower or contact 25 in engagement with the side surface cam 26 at all times.

The raised portion 18 of the peripheral cam member is provided with a plurality of spaced openings 30 therein to reduce weight and to introduce a more balanced operating function.

The relation of the parts and the operation of the device is as follows:

As the shaft 7 is rotated, assuming the raised portion 18 of the peripheral cam is located at the base of the cam plate 12 and the slide member 14 is at its lowermost position, the side surface cam 26 is now so related with the peripheral cam that when at this location the cam contact 25 will be in engagement with the lowered portion 28 and the claws 23 will be in their innermost position. As the cam portion 18 is rotated toward its uppermost position through rotation of the shaft 7 the slide member 14 will move upwardly of the slideway 13. This will cause the claws 23 carried by the arm 21 to simultaneously move upwardly. The side surface cam 26 is so designed that the dwell of the lowered portion 28 is still effective throughout this movement and the cam contact 25 is still in engagement with said lowered portion. Continued movement of the cam portion 18 in said upward direction eventually will move the claws 23 to their uppermost position while still lying in a direction inwardly of the slots 24. As the cam portion 18 tends to reach its uppermost position and throughout the dwell of said cam portion 18 the side surface cam 26 is so designed that the raised portion 27 now starts to come into play. At the position set forth above the tapered portion 31, lying between the raised and lower portions 27 and 28 of the side surface cam 26, will now be moved into contact with the contact member 25 of the arm 21 tending to move the claws 23 in a direction outwardly of the slots 24. Continued rotative movement in this direction causes the raised portion 27 of the side surface cam 26 to be moved into contact with the contact member 25 thereby moving the claws 23 to their fullest extent outwardly of the slots 24 and into latching engagement with the aligned spaced apertures 32 of the film 33 carried by the conventional film gate 34. The cam portion 18 is so designed that the full extent of its dwell is spent approximately at this location so continued rotative movement in this direction will now cause the slide member 14 to move in a downward direction in its slideway 13. The claws 23 will simultaneously move in a downward direction and the dwell of the raised portion 27 of the side surface cam 26 is such as to maintain contact with the contact member 25 throughout the complete downward movement of the claws 23 and will thereby cause the full extent of this movement to be imparted to the film. When the claws reach their lowermost position, the raised portion 27 of the side surface cam will then move out of engagement with the cam contact 25 and allow the said contact 25 to move into engagement with the lowered portion 28 of the side surface cam and will simultaneously cause the claws 23 to move inwardly of the slots 24 and out of engagement with the film. This movement of the film and the position of the spaced apertures 32 therein are so controlled as to successively move a set of said apertures into position of alignment with the claws 23 as the cams complete their successive cycles of movement and the above successive motion is imparted to the claws.

The above arrangement provides simple and efficient means and method of imparting successive and intermittent movement of the film and the device is so constructed as to be compact, with the housing 5 sealing in all of the working parts and protecting them from dirt, dust, etc.

The projector with which the device is illustrated, embodies the conventional lens projection system 35 and illuminating means 36.

In Fig. 5 there is shown a modified form of slide adapted to be positioned in the slideway 13. The said slide in this instance comprises a back main slide portion 39 which is provided with a shouldered recess 40 adjacent the upper end thereof in which is secured the upper lip portion 15. In this instance the lip portion 15 is provided with an angularly disposed portion 41 having slots 42 therein through which screws 43 are extended. This arrangement enables the distance between the upper lip 15 and the lower lip 16 to be adjusted so as to compensate for wear of parts and to maintain the cam 12 in a relatively intimate running fit between the lips. The main slide portion 39 is provided with a longitudinal slot 44 simulating the slot 17 and through which the shaft 7 is extended.

It is particularly pointed out that the device, as illustrated in Fig. 2, has substantially the same dimensional characteristics on the opposed sides of a vertical center line A—A and that this enables the parts to be placed in relatively compact relation with each other and also enables ready access to the film gate for the threading of film therewith from either side of the projector.

Through the combined adjustable features of the main slideway 13 and the modified structure of slide member as shown in Figs. 5 and 6 any looseness in play due to wear between the parts may be taken up by merely removing the cover of the housing, loosening the various screws which hold the parts in adjusted position by an amount sufficient to permit said parts to be adjusted to take up any looseness in play and by thereafter tightening the various screws to hold the parts in this position. This insures an intimate running fit of the parts and a much quieter operation of the device.

It is to be understood that the means and method of adjusting the various parts to compensate for wear as shown and described herein is only by way of illustration as several different arrangements might be used for accomplishing the same or similar results.

From the foregoing description it will be seen that simple, efficient and economical means and method have been provided for accomplishing all of the objects and advantages of the invention.

Having described my invention, I claim:

1. A device of the character described comprising a member having a slideway therein, a slide in said slideway, said slide having angularly disposed lip portions adjacent opposed ends thereof, a member rotatably supported about a given center between said lip portions, said member having a peripheral cam portion embodying a raised dwell section concentric with and at a fixed distance from said center and having a lowered dwell section concentric with and at a fixed distance from said center which is less than the raised dwell section and which during the rotation of said member will cause the slide to be reciprocated longitudinally of the slideway with substantially no lost motion or play between said member and said lip portions, said member having a side surface cam portion embodying arcuate raised and lowered dwell sections substantially concentric with said given center with said raised dwell section extending substantially throughout the effective length of the lowered dwell section of the peripheral cam, an arm pivotally connected to one of said lip portions, said arm having an engagement portion adjacent the free end thereof for engaging the side surface cam and having claw members adjacent said end, and resilient means for normally retaining said engagement portion in engagement with said side surface cam, the dwell sections of said side surface cam and said peripheral cam portions being so controlled as to positional relation with each other as to impart a controlled movement to said claw members.

2. A device of the character described comprising a housing with a slideway therein, a slide in said slideway, said slide having spaced forwardly projecting lip portions thereon, a member rotatably supported about a given center between said lip portions, said member having a peripheral cam portion embodying a raised dwell section concentric with and at a fixed distance from said center and having a lowered dwell section concentric with and at a fixed distance from said center which is less than the raised dwell section and which during the rotation of said member will cause the slide to be reciprocated in the slideway with substantially no lost motion or play between said member and said lip portions, said member having a side surface cam portion thereon embodying arcuate raised and lowered dwell sections substantially concentric with said given center with said raised dwell section extending substantially throughout the effective length of the lowered dwell section of the peripheral cam, an arm pivotally connected to one of said lip portions, said arm having an engagement portion adjacent the free end thereof for engaging the side surface cam and having claw members adjacent said end, and resilient means for normally retaining said engagement portion in engagement with said side surface cam, the dwell sections of said side surface cam and said peripheral cam portions being so controlled as to positional relation with each other as to impart a controlled path of movement to said claw members.

3. A device of the character described comprising a box-like member having a slideway in the rear wall thereof, a slot in said wall inwardly of the slideway and spaced slots in its front wall, a slide in said slideway, said slide having spaced forwardly projecting lip portions adjacent opposed ends thereof, a shaft extending through the slot in the rear wall, a member rotatably supported on said shaft between said lip portions, said member having a peripheral cam portion embodying a raised dwell section concentric with and at a fixed distance from the center of said shaft and having a lowered dwell section concentric with and at a fixed distance from said center which is less than the raised dwell section and which during the rotation of said member will cause the slide to be reciprocated in the slideway with substantially no lost motion or play between said member and said lip portions, said member having a side surface cam portion embodying arcuate raised and lowered dwell sections substantially concentric with said shaft center and with said raised dwell section extending substantially throughout the effective length of the lowered dwell section of the peripheral cam, an arm pivotally connected to one of said lip portions and having an engagement portion engaging the side surface cam, means adjacent the free end of the arm adapted to extend through the spaced slots for engaging a film and resilient means for normally retaining said engagement portion in contact with said side surface cam portion, the dwell sections of said side surface cam and said peripheral cam portions being so positioned relative to each other as to cause the film engagement means to be moved in a controlled path.

4. A device of the character described comprising a box-like member having a slideway in the rear wall thereof, a slot in said wall inwardly of the slideway and spaced slots in its front wall, a slide in said slideway, said slide having spaced forwardly projecting lip portions adjacent opposed ends thereof, a shaft extending through the slot in the rear wall, a cam member rotatably supported on said shaft between said lip portions and having a peripheral cam portion embodying a raised dwell section concentric with and at a fixed distance from the center of said shaft and having a lowered dwell section concentric with and at a fixed distance from said center which is less than the raised dwell section and which during the rotation of said member will cause the slide to be reciprocated in the slideway with substantially no lost motion or play between said member and said lip portions, said member having a side surface cam portion embodying arcuate raised and lowered dwell sections substantially concentric with said shaft center and with said raised dwell section extending substantially throughout the effective length of the lowered dwell section of the peripheral cam, an arm pivotally connected to one of said lip portions and having an engagement portion engaging the side surface cam, claw means adjacent the free end of the arm adapted to extend through the spaced slots for engaging a film and resilient means for normally retaining said engagement portion in contact with said side surface cam portion, the dwell sections of said side surface cam and said peripheral cam portions being so positioned relative to each other as to cause the claw means to be moved in a controlled path.

5. A device of the character described comprising a member having a slideway therein with the side portions of said slideway being adjustable relative to each other, a slide in said slideway, said slide having angularly disposed lip portions adjacent opposed ends thereof, a member rotatably supported about a fixed center between said lip portions, said member having a peripheral cam portion embodying a raised dwell section concentric with and at a fixed distance from said center and having a lowered dwell section concentric with and at a fixed distance from said center which is less than the raised dwell section and which during the rotation of said member will cause the slide to be reciprocated longitudinally of the slideway with substantially no lost motion or play between said member and said lip portions, said member having a side surface cam portion embodying arcuate raised and lowered dwell sections substantially concentric with said given center and with said raised dwell section extending substantially throughout the effective length of the lowered dwell section of the peripheral cam, an arm pivotally connected to one of said lip portions, said arm having an engagement portion adjacent the free end thereof for engaging the side surface cam and having claw members adjacent said end, and resilient means for normally retaining said engagement portion in engagement with said side surface cam, the dwell sections of said side surface cam and said peripheral cam portions being so controlled as to positional relation with each other as to impart a controlled movement to said claw members.

6. A device of the character described comprising a member having a slideway therein, a slide in said slideway, said slideway having angularly disposed lip portions adjacent opposed ends thereof, at least one of said lip portions being adjustable relative to the other for altering the distance therebetween, a member rotatably supported about a fixed center between said lip portions, said member having a peripheral cam portion embodying a raised dwell section concentric with and at a fixed distance from said center and having a lowered dwell section concentric with and at a fixed distance from said center which is less than the raised dwell section and which during the rotation of said member will cause the slide to be reciprocated longitudinally of the slideway with substantially no lost motion or play between said member and said lip portions, said member having a side surface cam portion embodying arcuate raised and lowered dwell sections substantially concentric with said given center and with said raised dwell section extending substantially throughout the effective length of the lowered dwell section of the peripheral cam, an arm pivotally connected to one of said lip portions, said arm having an engagement portion adjacent the free end thereof for engaging the side surface cam and having claw members adjacent said end, and resilient means for normally retaining said engagement portion in engagement with said side surface cam, the dwell sections of said side surface cam and said peripheral cam portions being so controlled as to positional relation with each other as to impart a controlled movement to said claw members.

7. A device of the character described comprising a member having a slideway therein, a slide in said slideway with the side portions of said slideway being adjustable relative to each other, said slide having angularly disposed lip portions adjacent opposed ends thereof, at least one of said lip portions being adjustable relative to the other for altering the distance therebetween, a member rotatably supported about a fixed center between said lip portions, said member having a peripheral cam portion embodying a raised dwell section concentric with and at a fixed distance from said center and having a lowered dwell section concentric with and at a fixed distance from said center which is less than the raised dwell section and which during the rotation of said member will cause the slide to be reciprocated longitudinally of the slideway with substantially no lost motion or play between said member and said lip portions, said member having a side surface cam portion embodying arcuate raised and lowered dwell sections substantially concentric with said given center and with said raised dwell section extending substantially throughout the effective length of the lowered dwell section of the peripheral cam, an arm pivotally connected to one of said lip portions, said arm having an engagement portion adjacent the free end thereof for engaging the side surface cam and having claw members adjacent said end, and resilient means for normally retaining said engagement portion in engagement with said side surface cam, the dwell sections of said side surface cam and said peripheral cam portions being so controlled as to positional relation with each other as to impart a controlled movement to said claw members.

JOSEPH A. GIROUX.

REFERENCES CITED

The following references are of record in the file of this patent:

UNITED STATES PATENTS

| Number | Name | Date |
|---|---|---|
| 1,542,409 | Readeker | June 16, 1925 |

FOREIGN PATENTS

| Number | Country | Date |
|---|---|---|
| 168,183 | Great Britain | Sept. 1, 1921 |
| 100,962 | Austria | Sept. 10, 1925 |